Sept. 25, 1945.  L. V. WHIPPLE ET AL  2,385,751
PACKAGE SEALING STRIP APPLYING MECHANISM
Filed Feb. 12, 1942    6 Sheets-Sheet 3
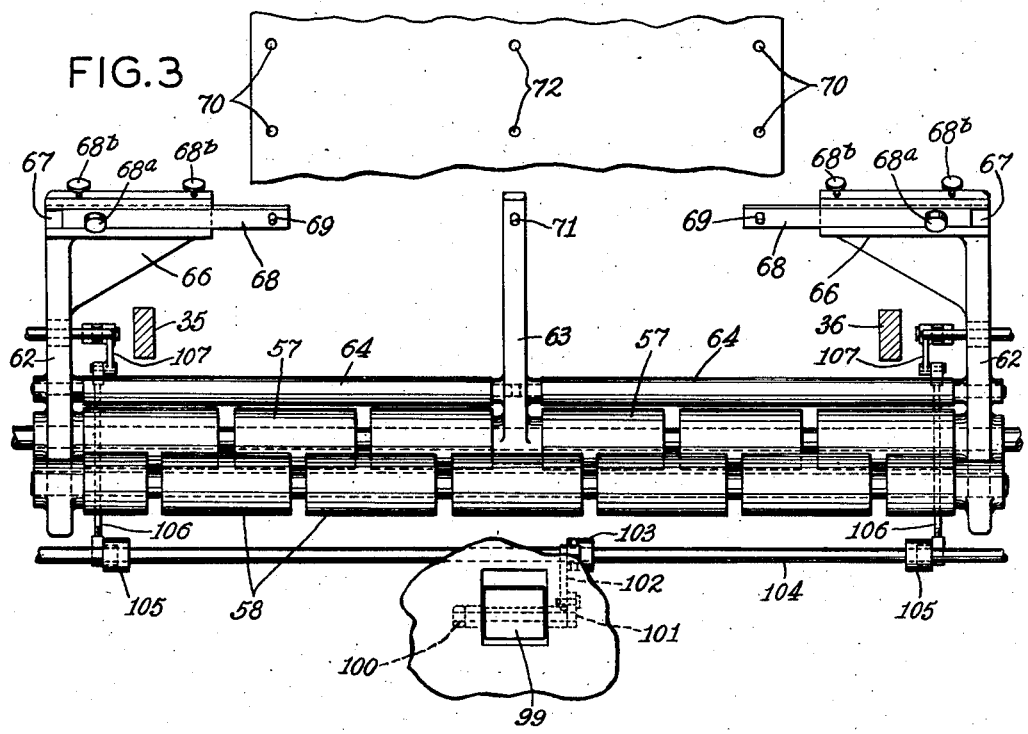
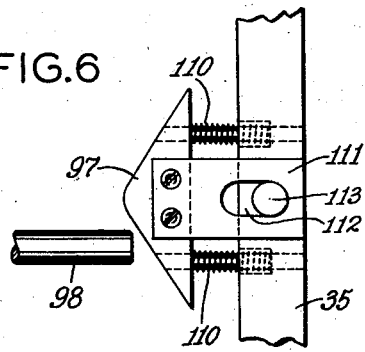
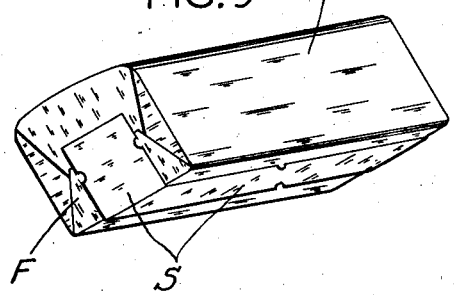
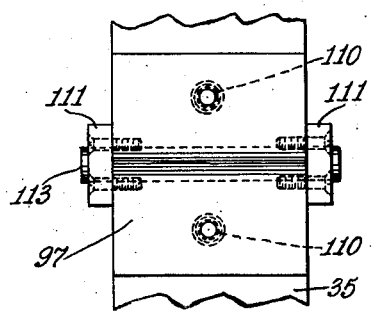
INVENTOR
LEON V. WHIPPLE
SAMUEL W. POLLOCK
BY George S. Hastings
ATTORNEY Sept. 25, 1945. L. V. WHIPPLE ET AL 2,385,751
PACKAGE SEALING STRIP APPLYING MECHANISM
Filed Feb. 12, 1942 6 Sheets-Sheet 4
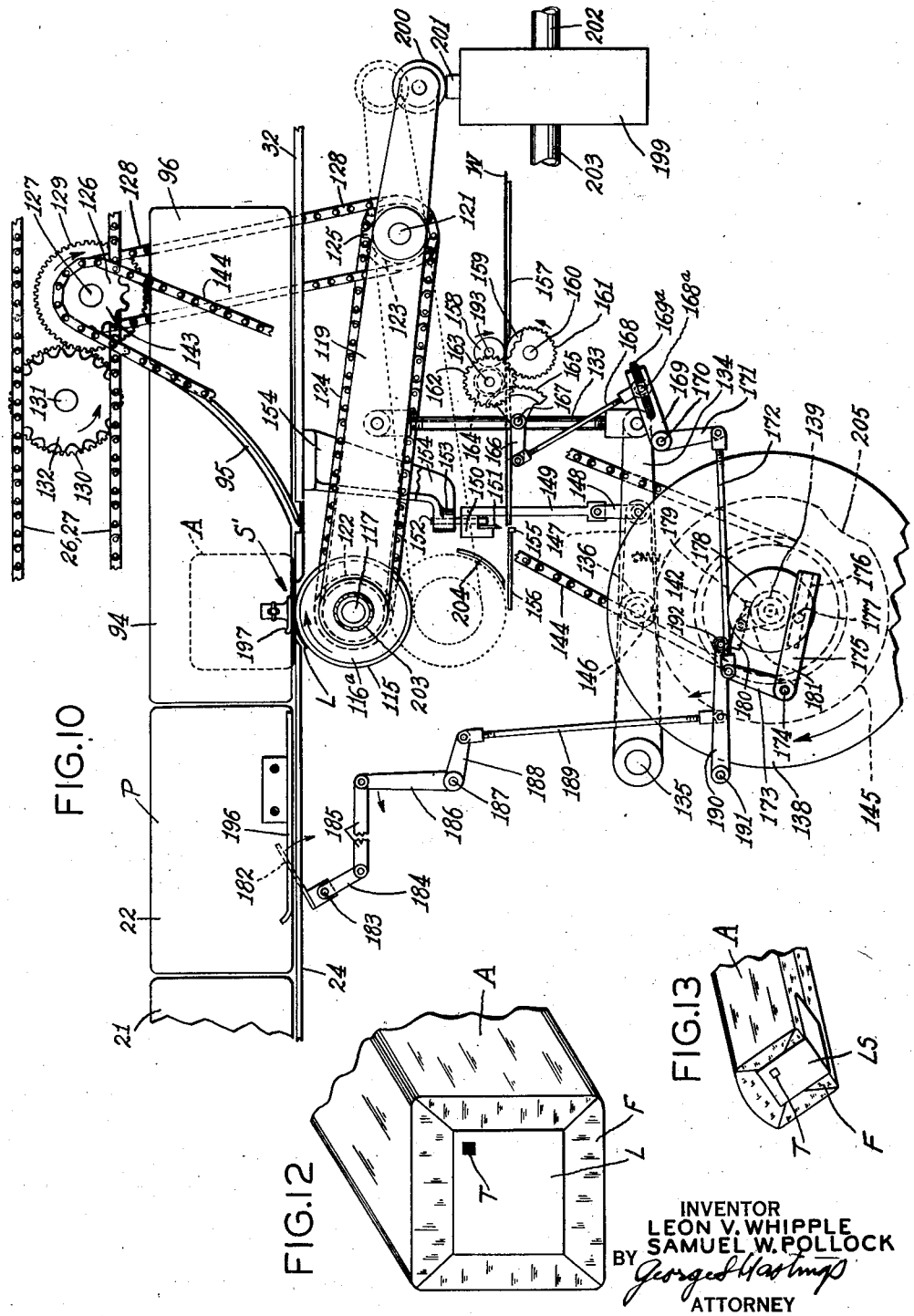
INVENTOR
LEON V. WHIPPLE
SAMUEL W. POLLOCK
BY
ATTORNEY Sept. 25, 1945. L. V. WHIPPLE ET AL 2,385,751
PACKAGE SEALING STRIP APPLYING MECHANISM
Filed Feb. 12, 1942 6 Sheets-Sheet 5
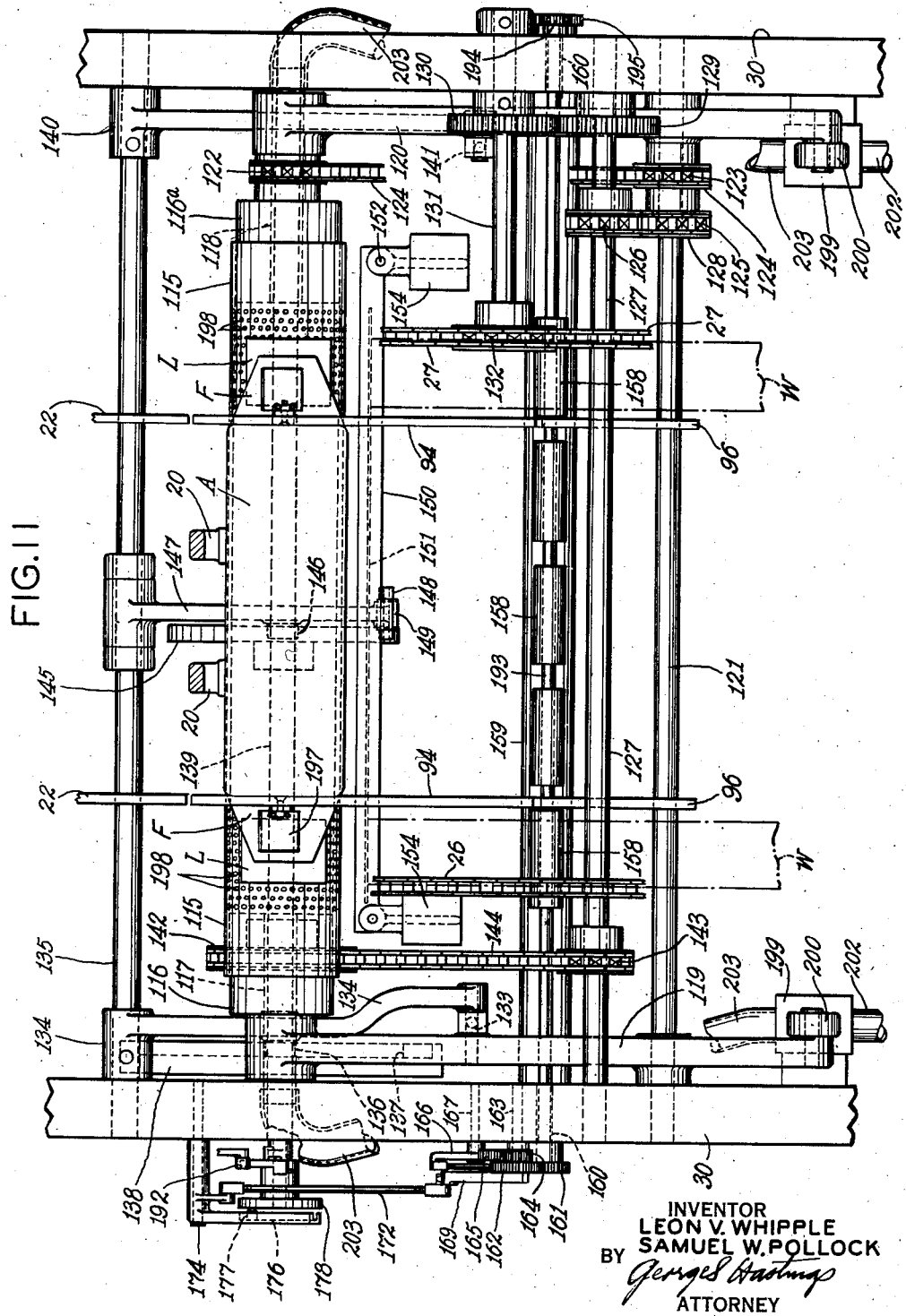
INVENTOR
LEON V. WHIPPLE
BY SAMUEL W. POLLOCK
ATTORNEY

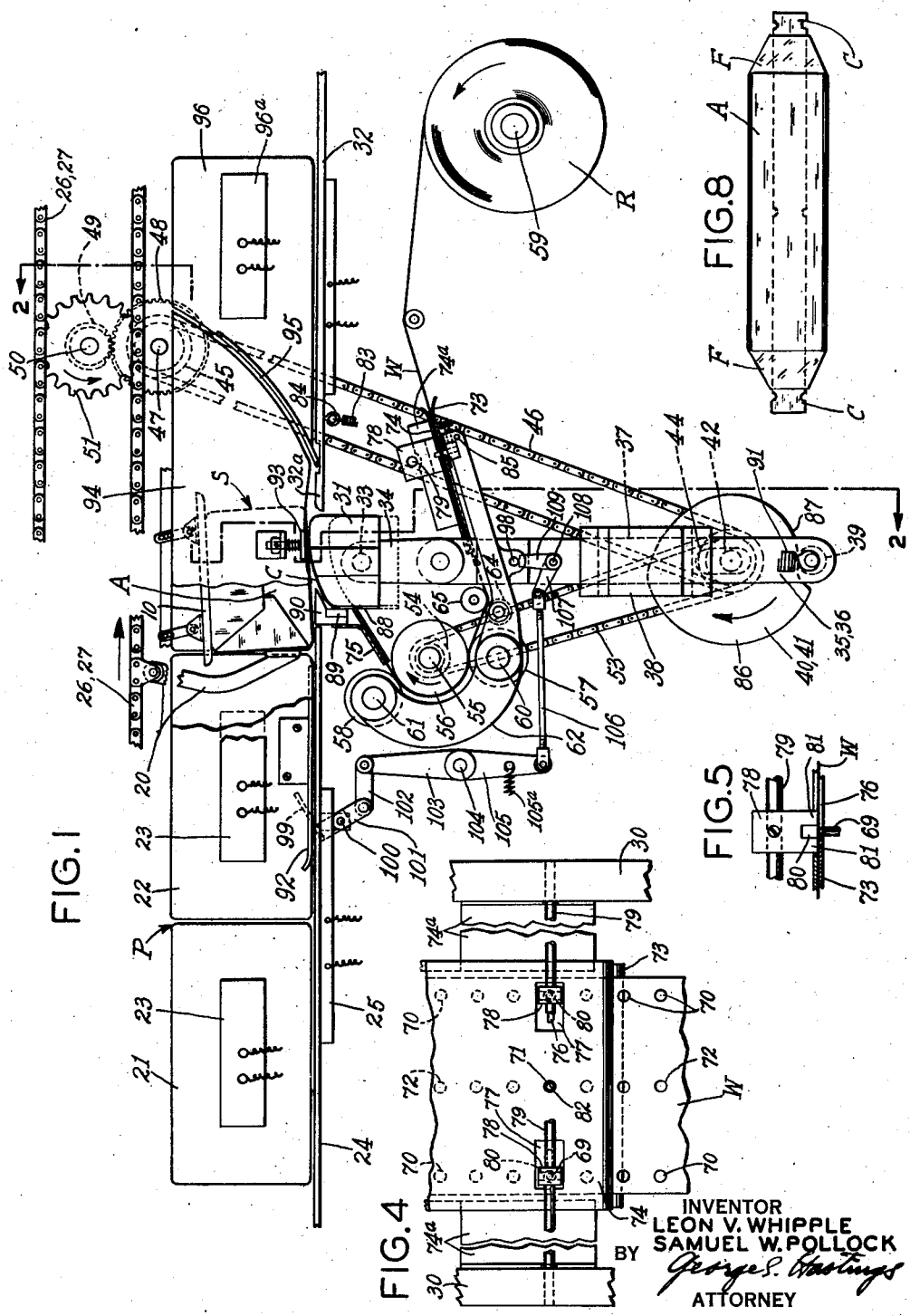

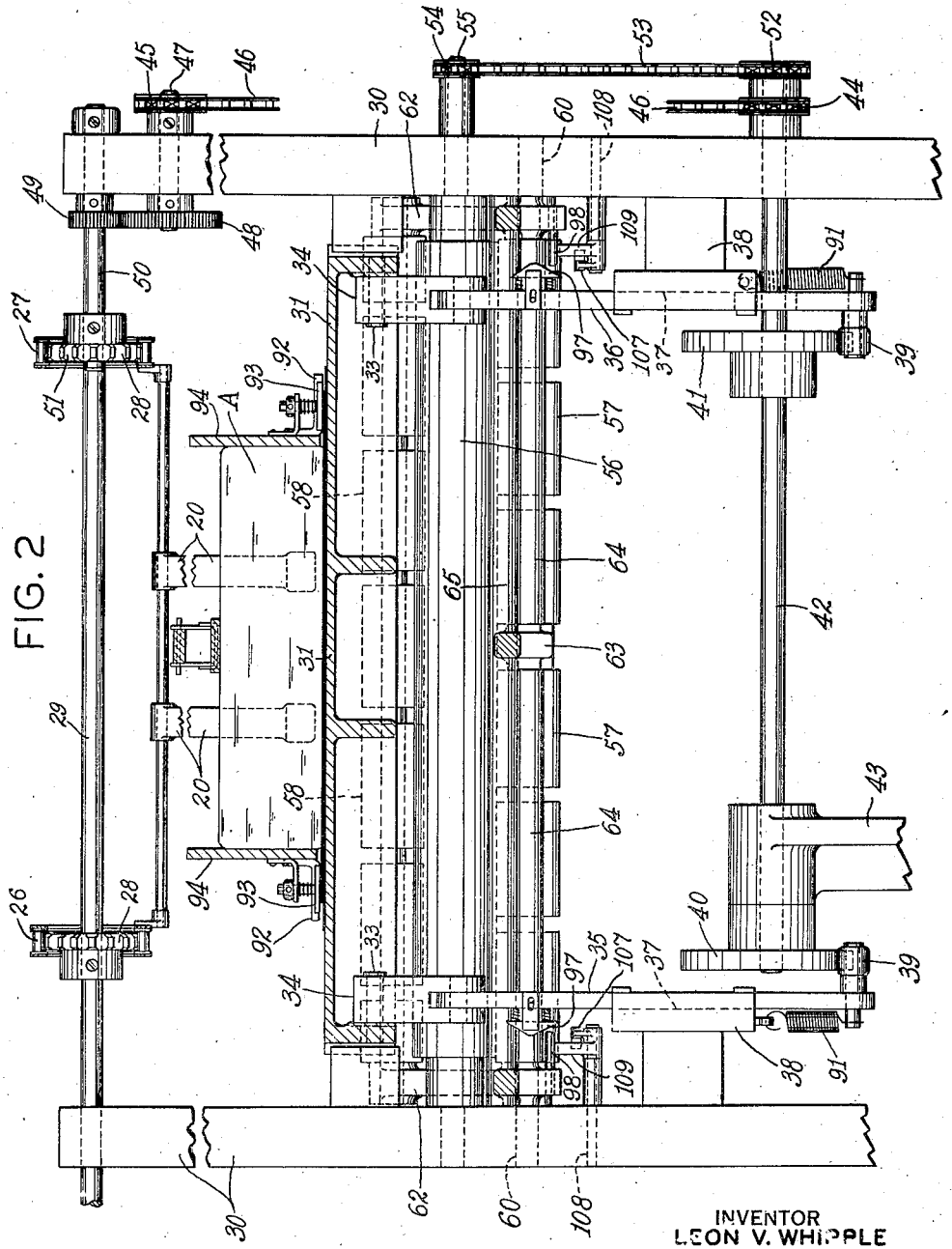

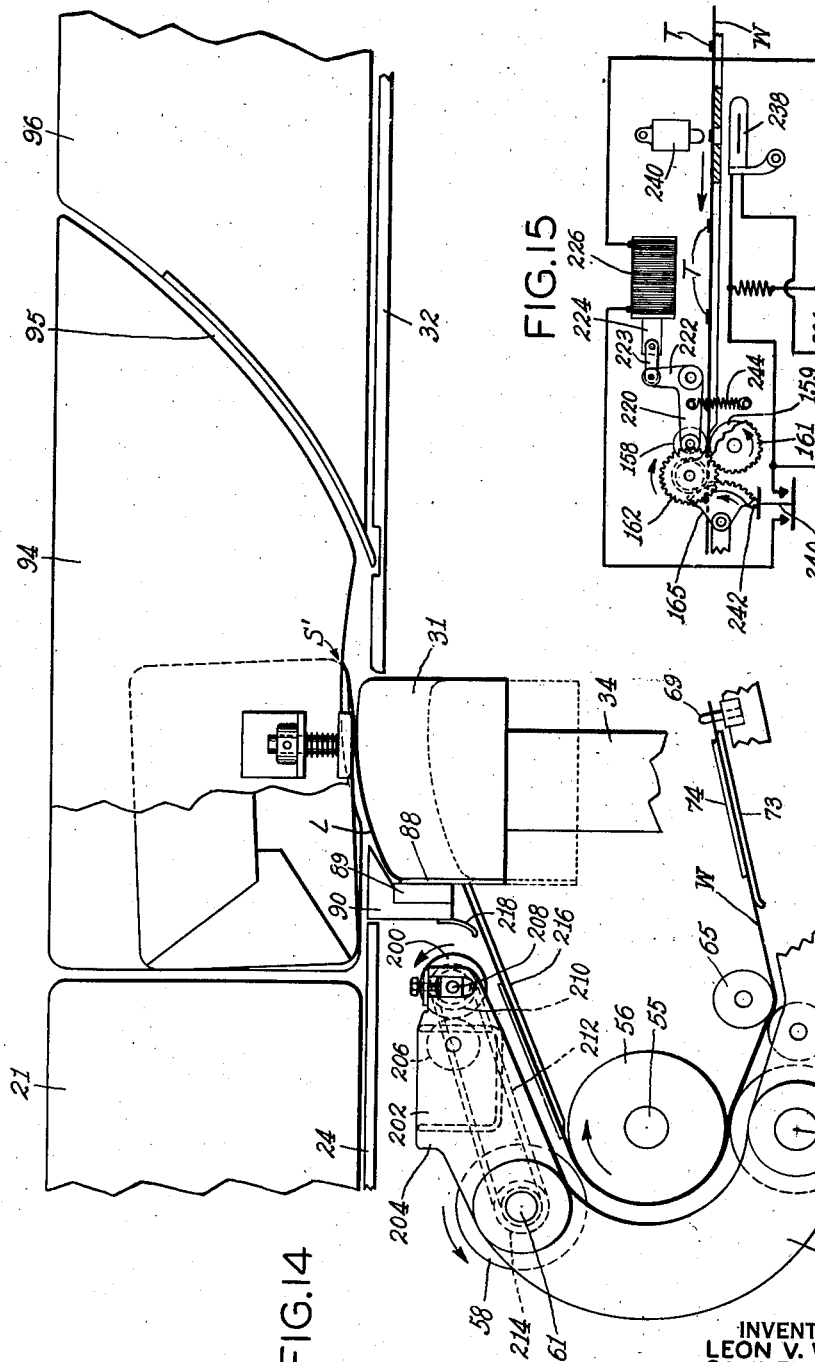
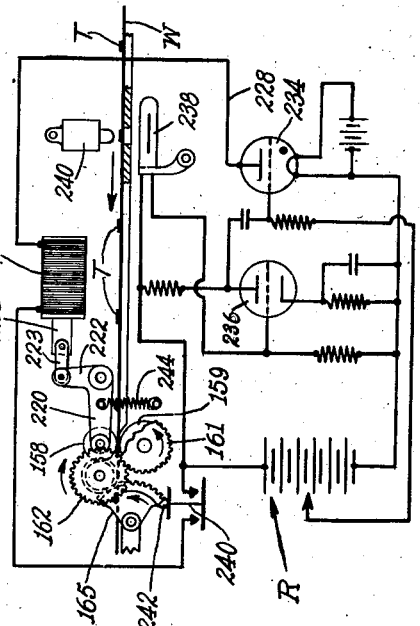

Patented Sept. 25, 1945

2,385,751

UNITED STATES PATENT OFFICE 2,385,751

PACKAGE SEALING STRIP APPLYING MECHANISM

Leon V. Whipple, Floral Park, and Samuel W. Pollock, Brooklyn, N. Y., assignors to American Machine and Foundry Company, a corporation of New Jersey Application February 12, 1942, Serial No. 430,598

37 Claims. (Cl. 93—2)

This invention relates to package sealing strip applying mechanism and more particularly to mechanism for applying sealing strips to a selected part or parts of articles being wrapped in order to produce strong and firm packages.

This invention relates further to the application of sealing strips to complete the formation of packages which have been wrapped, or partially wrapped, in sheet materials and more especially it has reference to the wrapping and sealing of loaves of bread or the like in sheet materials such as waxed or unwaxed paper, all types of film sheets such as Cellophane or regenerated cellulose, Pliofilm, cellulose acetate, lacquer coated papers, etc., such as "Diafane" and other wrapping materials capable of use as protective coverings.

According to our invention sealing strips are applied to a selected part or parts of an article, either wrapped or partially wrapped as the latter is moving along a wrapper foldway during which time one or more flaps of the wrapper may be folded adjacent the article so that the sealing strip can be applied to the selected portions of the package wrapper at the proper time either during a dwell or the continuous movement of the package through the machine.

It is an object of our invention, therefore, to provide a novel method and machine for rapidly producing strip sealed wrapped packages.

It is also an object of our invention to utilize a web supply of strip sealing material which is in the form of a continuous web and cut from the web a desired width of sealing material in accordance with the requirements of the particular package being produced. According to one form of our invention, the strip is applied to the longitudinal seam formed by the inner lap and overlap of the wrapper encircled about an article and extends beyond the ends of the article so that if all end flaps are formed, or when the end flaps are all folded against the ends of the article being wrapped, the ends of the strip likewise are folded against and sealed firmly to the ends of the package and the folded end flaps.

While our invention pertains more generally to the wrapping of bread and other articles in wax paper and other materials set forth above, such as heat sealable Cellophane which has a heat energizable coating thereon, or wrapping materials like Pliofilm and cellulose acetate films which in themselves become fused when brought into contact with heated members, the cost of these materials is relatively high and adds somewhat to the net cost of the wrapped product to the ultimate consumer. It is, therefore, a further object of our invention to make possible the efficient utilization of uncoated paper or uncoated Cellophane or other like uncoated materials which do not necessarily require heat sealing in their use as article wrappers by employing sealing strips which are affixed to such packages by suitable adhesives with or without the application of heat. By the use of this form of our invention, sealing strips which do not necessarily coact with any material or coating on wrappers permit the elimination of more costly types of wrappers and the production of satisfactory commercial packages.

It is a further object of our invention to provide a wrapping machine which is capable of producing wrapped packages wherein the wrappers may be either heat sealable or non-heat sealable wrapping material but wherein a heat sealable wrapping sealing strip can be applied with considerable rapidity to any desired portion or part of the overlapped wrapper material in such a manner that the strip or strips effect a firm and positive seal of the several parts of the wrapper about the article.

It is a further object of our invention to provide mechanism capable for use on a wrapping machine and operative to cut wrapper sealing strips of any desired width or shape from a broad web so located on the wrapping machine that it can be fed to strip cutting position adjacent the article to be strip sealed, which article may or may not have all projecting portions of the wrapper folded about the article at the time the strip is applied to a selected part or parts of the article being wrapped and sealed. The use of a web supply and the formation of seals in the manner described above is practical and simple and furnishes considerable saving in time, labor and material because of the fact that a larger supply of strip sealing material is always available, less time is consumed in placing new rolls of web material on the machine because a given roll lasts longer, and hence the operator is free to tend to other duties while the machine is operating.

It is a further object of our invention to provide article strip sealing mechanism which is operable to form wrapper sealing strips of any desired width or shape from a wide web of material and apply the cut strips to the article being handled.

It is a further object of our invention to provide a wrapping machine having a strip sealing mechanism in which sealing strips of desired size and shape are cut from the free end of a relatively wide web and applied along the longitudinal seam and end flaps of a wrapped package.

Our invention also contemplates the production of packages having strip seals affixed to the ends of each package and partly along the longitudinal wrapper seam.

The strip sealing material which we prefer to employ is provided in roll form and preferably consists of a web greater in width than the length of the article being wrapped and sealed, so that when strips of desired width are cut from the web and applied to the wrapped or partially wrapped article, portions of the strip will be available for use in sealing the ends of the package. The net result obtained is a package having a strip sealed longitudinal seam and sealed ends which makes for a strong, efficient and pleasing package. If desired, the roll of strip material may be printed so that each strip seal applied can be used as an advertising medium.

The strip sealing material may be made of paper or any suitable sheet material having a composition or coating on the surface which is to be applied to the article wrapper of such a nature that it becomes energized by heat so that the coating becomes tacky and the seal strip may be caused to adhere firmly to the package by pressure. If, for instance, a package to be sealed has a wax paper wrapper, the strip sealing material may be provided with a heat sensitive or thermoplastic coating of the type disclosed in Smith et al., Patent No. 2,228,785, granted January 14, 1941. When strip seals provided with this type of coating are applied to wax paper packages under heat and pressure, the coating fuses with the wax, forms a strong bond, and adheres thereto with great tenacity.

Our invention also consists in the provision of a wide web of strip forming material, usually of a width greater than the length of articles being wrapped, provided with a suitable adhesive so that when a length is cut therefrom and applied to an article it can be pressed against the lapped ends of the wrapper on one face of the article and have the ends thereof folded against the ends of the wrapped article.

Our invention also contemplates the provision of a web of sheet material provided with a heat energizable adhesive, which web is fed in the direction of movement of articles to be sealed along a folding-guiding chute, so that a suitable length of web may be separated from the web and have its adhesive coating energized and applied as a sealing strip to the article to be treated.

Our invention is further characterized by the provision of two webs of sheet material mounted on a wrapping machine and arranged to be fed in the direction of movement of articles being wrapped through the machine so that predetermined lengths may be cut from the ends of the webs and applied to the ends only or to ends and the longitudinal wrapper seam of the article adjacent the ends to form a strip sealed package.

With these and other objects not specifically mentioned in view, the invention consists in certain combinations and constructions which will be hereinafter fully described, and then set forth in the claims hereunto appended.

In the accompanying drawings which form a part of this specification, and in which like characters of reference indicate the same or like parts:

Figure 1 is a side elevation of a portion of a wrapping machine showing the strip applying mechanism;

Figure 2 is an end elevation taken from line 2—2 of Figure 1;

Figure 3 is a plan view showing the feed rollers, the no package—no strip mechanism, and means for adjusting the strip guides to suit different lengths of webs;

Figure 4 is a detail plan view of the web guiding means;

Figure 5 is a detail end view of Figure 4;

Figure 6 is an enlarged view of the no package—no strip plunger control;

Figure 7 is a side view of the same;

Figure 8 is a plan view of a partly wrapped package with the sealing strip applied to the bottom seam of the package and extending beyond the end flaps of the wrapper;

Figure 9 shows a finished sealed package, the bottom seam and end folds of which are sealed by a sealer strip;

Figure 10 is a side elevation of a modified form of the invention showing a portion of a wrapping machine equipped to apply several types of strip seals and end labels;

Figure 11 is a plan view of a portion of Figure 10;

Figure 12 shows a package with an end label applied thereto;

Figure 13 shows a strip applied to an end of a package, in a manner to form a combined end label and part bottom seal;

Figure 14 is a partial side elevation of another modified form of the invention for use with a different type of sealing strip web; and Figure 15 is a diagram showing a suitable circuit for use in electrically registering webs.

Referring to Figures 1, 2 and 3 of the drawings, the article which has been partly enfolded in a wrapper preferably provided with a thermoplastic coating, such as wax or lacquer, during its passage through the machine, is moved to a point where it is engaged by a pair of pusher arms 20 and progressed thereby to a foldway consisting of a bottom plate 24 over which the articles travel, and sets of spaced relatively adjustable end sealer plates 21 and 22, all being conventional in construction, forming a part of the wrapping machine. Heating elements 23 and 25 may be provided for the side sealer and bottom plates, respectively. It will be evident that as the wrapped or partially wrapped articles move through the passageway P the coating on the wrapper will be energized by the heat of the several plates so that the wrapper folds will be sealed together.

The articles are moved in succession along the passageway P by means of a series of pairs of pusher arms 20 which are carried by endless traveling chains 26, 27 driven by sprockets 28 (Figure 2) fixed to a cross shaft 29 supported by the side frames of the machine much in the manner as shown in Schmitt Patent No. 1,851,295 granted March 29, 1932. The other portions of the chains 26 and 27 run over idler sprockets (not shown) forming a part of the machine. A reference to Figure 1 shows that the conveyor flights 20 deliver each article to be strip sealed to a strip seal applying station designated generally S. Station S in the preferred embodiment of our invention is formed by transverse gap extending between the rear end of plate 24 and the front end of a second bottom supporting and sealing plate 32 of the machine, and of a width sufficient to accommodate a transversely extending strip applying head 31 movable vertically into and out of the gap in order to apply strip seals to articles positioned at sealing station S.

Articles being strip sealed may be fully wrapped so far as the application of a wrapper thereabout and the completion of all folds is concerned. If articles in that condition are moved in successive steps by pushers 20 to seal applying station S, as above described, a length of sealing strip having a suitable adhesive, preferably of a heat sensitive type, cut from web W can be applied to the bottom of the package along and over the longitudinal seam thereof with the strip seal ends projecting beyond the ends of the package. When the package is again advanced by pusher flights 20 through the passageway P, after passing over projection 32a of plate 32 which wipes the strip upwardly against the bottom of the package to complete the affixation of the strip to the bottom thereof, the ends of the strip seal encounter upwardly curved slots 95 formed by longitudinally spaced folding and sealing plates 94, 96 and the strip ends are folded and pressed against the ends of the package and heat-sealed thereto as the package passes between folding-sealing plates 96 which are heated by conventional heating units 96a.

If desired, however, partially wrapped packages having an end fold extending beyond each end of the partially wrapped article may be introduced into the folding-sealing passageway P. As shown in Figures 1, 2, 10 and 11, partially wrapped articles having their bottom end folds projecting from the incomplete package ends may be fed through the foldway P by pushers 20 past heat-sealing plates 21, 22 and with projecting wrapper flaps F extending beneath heat-sealing plates 21, 22 (see Figures 2 and 11) which operate to heat seal the end folds while the bottom plate 24 seals the bottom seam. At station S, head 31 applies a strip seal to the longitudinal bottom seam and also to the projecting wrapper ends and since the sealing strip preferably is longer than the over-all length of the article and projecting end folds, the ends C of the sealing strip project beyond the ends of the extended bottom end folds of the package. When, therefore, flaps F are folded up against the ends of the package they will be secured firmly thereto by the energized coating on the end flaps and sealing strip. The sealing strip which is raised by head 31 into engagement with the underside of an article moving from plate 24 to strip applying station S has its coating rendered tacky by engagement with the hot coating material on the underside of the article to which the strip is being applied. As shown in Figure 1, head 31 preferably is provided with a downwardly curved strip supporting surface upon which the leading end of the web is fed onto the top of the head so that when head 31 is moved upwardly by mechanism described hereinafter, the front edge of a strip C is pressed against the tacky portion of the wrapper on the bottom of a package and end flaps and affixed thereto. When a package and a strip partially attached thereto in this manner is moved forward along the runway by a flight 20 past projection 32a of plate 32, the remainder of strip C is wiped against the longitudinal bottom seam and extending end flaps thereby completing the application of the strip to the bottom of the package and the end flaps projecting outwardly therefrom. The strip will, therefore, cling to the package and be transported therewith as it moves onto supporting-sealing plate 32.

In the preferred embodiment of our invention, as shown in Figures 1 to 9, inclusive, the sealing strips are cut from a roll of web material, which material is of a width greater than the over-all length of the article plus the extended end flaps F so that the ends of the strip to be applied to each package projects beyond the extended end flaps F. Web roller R is located with its spindle extending transversely of the machine and therebelow so that the web can be fed in any desired manner to the sealing strip applying station S where the desired length of material is cut from the web and applied to the package by applying head 31. It will be seen that when the strip sealing material is fed in this manner or in the same general direction of articles moving along the passageway P, each strip is applied to its respective package with great simplicity and also simplified mechanism may be used to obtain the proper disposition of each strip about the package. Also, since the coating on the wrapper is rendered tacky as the result of passing over plate 24, the coaction between the heated wrapper coating and that on the strip seal to be applied, assists materially in the application of sealing strips to packages so that by the time the packages, with their sealing strips, move from station S, the strip is properly located against the longitudinal seam of the package and ready for final heat sealing as the package passes along plate 32 and between end folding and sealing plates 94, 95.

While any suitable web feeding device may be used, we prefer to employ mechanism which will maintain the web in proper register at all times in order that the proper amount of strip sealing material may be separated therefrom and if advertising indicia has been printed upon the web, if the latter is properly registered, each package issuing from the machine will be uniform insofar as advertising is concerned. As shown in Figure 1, the web material in the roll R may have a suitable thermoplastic or heat sensitive adhesive applied on its inner face, as mentioned above, so that as the material is drawn from the supply and feeds onto the head 31, the adhesive coating portion will be in position to stick to or coact with the coating on the packages being strip sealed.

Referring to Figures 1, 2 and 3, head 31 supports at each end a stud 33 carrying the upper end of a link 34 connected to the cam actuated bars 35 and 36, respectively. Each bar 35 and 36 travels in a runway 37 provided in blocks 38 suitably fastened to side frames 30. The bars at their lower ends have cam followers, such as rollers 39, adapted to engage their respective cams 40 and 41 mounted on a shaft 42 supported at one end by the side frame 30 and at its other end by a bracket 43 of the machine. Cam shaft 42 is driven by means of a sprocket 44 mounted thereon through a chain 46 running on a sprocket 45 fixed to shaft 47 supported by side frame 30 and provided with a gear 48 meshing with a gear 49 on a shaft 50 having a sprocket 51 which is driven by the traveling chain 27 of the flight conveyor mechanism.

Shaft 42 also carries a sprocket 52, which by means of a chain 53 drives a sprocket 54, mounted on a shaft 55 of roller 56, the latter being operative with the aid of rollers 57 and 58 to intermittently feed the desired length of strips from the web W supplied from a reel R mounted on a shaft 59 suitably supported on the machine. Rollers 57 and 58 are mounted on shafts 60 and 61, respectively, shaft 60 being supported by the side frames 30 which carry the arms 62 which journal shaft 61.

Shaft 60 also supports a center arm 63, which together with arms 62 support clamp rollers 64 adapted periodically to engage a clamp roller 65 supported by the frames 30. The arms 62, at their rearward end, are provided with wings 66 (Figure 3) having runways 67 supporting adjustable bars 68 which carry registering pins 69 adapted to engage and project through perforations 70 provided in the sealing strip W. The positions of bars 68 and pins 69 will vary in accordance with the width of the web W. Handles 68a are used in sliding the bars transversely in runways 67 and set screws 68b secure the bars in their adjusted positions. The center arm 63 supports a pin 71 adapted to engage with the center row of perforations 72 of web W. The longitudinal spacing of the perforations 70 and 72 (Figure 3) along the web determines the length of strip S to be fed from supply R and applied to each article A.

The web W is threaded through the guide plates 73 and 74 (Figures 1 and 5), mounted on bars carried by side frames 30, and between the rollers 56, 57 and 58 and through spaced members 75, suitably mounted below plate 24, which guide the web onto the head 31. To accommodate different widths of webs, the lower guide plate 73 at each end is provided with an elongated slot 76 (Figure 4) which permits adjustment of the web registering pins 69, as described hereinabove, laterally in slots 76 to register with perforations in web W. Upper guide plate 74 is provided at each end with a slot 77 which permits adjustment of slotted blocks 78 relative to pins 69. Blocks 78 mounted on a cross rod 79, which may be supported by the side frames 30, are provided with openings or slots 80 slightly wider than the diameter of pins 69, so that the spaced portions or prongs 81 (Figures 4 and 5) formed on the block rest upon the web W moving between plates 73, 74, hold it taut and overcome the tendency of the pins 69 to lift the web or otherwise impede its proper feed. Plates 73 and 74 also have a hole 82 permitting movement of the center pin 71.

When a length of web is to be fed to supply a sealing strip, arms 62 and 63 are rocked clockwise (Figure 1) and the web W is advanced by rollers 56, 57 and 58 until the leading end thereof is delivered onto the head 31 in position to be applied to a package to be strip sealed. The movement of arms 62 and 63 causes pins 69 and 71 to move out of the perforations in the web so that the web is released for feeding. When, however, the next row of perforations 70 and 72 becomes aligned with the pins 69 and 71, a spring 83 (Figure 1) having one end held by an eye 84 fastened to plate 32 and its other end connected to a stud 85 provided on one of the arms 62, raises the side arms 62 and center arm 63 so that the pins pass through the perforations 70 and 72 and stop web movement. In this position rollers 64 and 65 clamp the web and rollers 57, 58, carried by arms 62 and are swung away from their coacting roller 56 whereby the paper feed stops. At this time the cam rollers 39, which are held in engagement with cams 40, 41 by springs 91, ride off the high portion 86 thereof onto surfaces 87' whereupon head 31 snaps upward to apply the strips S onto the bottom of the article A. Head 31 in rising to strip applying position causes a knife 88 attached to the head (Figure 1) to sever the strip from the web W, whereupon head 31 with the newly cut strip seal moves to its upper limit to apply the seal to an article positioned to receive it. Knife 88 coacts with a ledger plate 89 which is carried by a bridge 90 suitably mounted on the machine adjacent the rear end of plate 24.

If the package to be strip sealed which has been placed in the machine has its bottom end flaps unfolded or extending outward beyond the end of the package (as shown in Figures 1, 2, 8 and 11), the open end flaps F of the wrapper pass under a presser plate 92 attached to each of the sealer plates 22, which tends to press the flaps F against the heated bottom plate 24, thus heating the wrapper so that the strip S will adhere to the bottom of the package and the extended flaps. A spring pressed plunger 93 provided on folder plate 94 at station S (Figure 1) serves as a backing plate to press the strip S onto the flaps F as the partially formed package passes over head 31 and receives the strip from the head. A top pressure plate 10 may be mounted above station S to hold a package in proper position against upward movement during the application of strip C by head 31.

The article A having passed over the head 31 has the strip S affixed to it as shown in Figure 8. As the package advances, the open end flaps F and the projecting ends of the strip S engage the foldway 95 formed by folder plates 94 and 96 and as the result of the continued movement of the package, the flaps F and extending ends C of the strip are folded against the article and heat sealed to the same in passing the heated plates 96. The finished article has the appearance shown in Figure 9 with the sealing strip S securely applied to the sealed longitudinal seam and end flaps of the package.

As the rollers 39 again are acted upon by the high portions 86 of the cams 40 and 41, bars 35 and 36 are forced downwardly to return head 31 to its inactive position (shown in dotted lines in Figure 1). Bars 35 and 36 are equipped with spring pressed plungers 97 (Figures 2, 6 and 7) which normally serve to engage pins 98 carried by arms 62 during their descent so that a length of web material can be fed when not locked by pins 69, 71 against movement. The tripping of arms 62 and also arm 63 effects a release of the web by pins 69 and 71 and allows the web W to be fed one length, as described hereinabove. With pins 69 and 71 lowered, the clamp roller 64 swings away from its coacting roller 65 permitting movement of the web, and at the same time rollers 57 and 58 move into engagement with the feed roller 56 as described hereinabove.

Plunger 97, which actuates pin 98 of arm 62, can be so located as to depress pin 98 only at the very end of the down stroke of arms 35 and 36. This will disengage pins 69 and 71 so that paper web W can start feeding forward. After a short interval, cams 40 and 41 can be given slight releases so that arms 35 and 36 move upwardly for a short distance sufficient to bring pins 69 and 71 to rest on the underside of web W. When a cutout occurs, the pins 69 and 71 will drop into said cutout and stop the forward feeding of the web.

If a skip occurs in the feeding of the articles, a device is provided for incapacitating the strip feeding mechanism for one or more cycles or until an article advances to the seal applying station S. This result is accomplished by locating a feeler or registering finger 99 in the path of the oncoming article. Finger 99, (Figures 1 and 3) is mounted on a stud 100 equipped with an arm 101 connected to a link 102 which connects to an arm 103 mounted on a pivot shaft 104 mounting arms 105, which support one end of rods 106 connected to levers 107 loosely mounted on studs 108 carried by the side frames 30. The upright portion 109 of levers 107 normally is held by a spring 105a in locking position under pin 98 (as shown in Figures 1 and 2). When an article advances along the runway P of the machine, finger 99 is depressed thereby through the described linkage and causes members 109 of levers 107 to be swung out of the path of pins 98 so that the descending plunger 97 depresses arms 62, 73, swings them on shaft 60, and sets the paper feed in motion. If no article is present to actuate finger 99, members 109 remain under pins 98 thus holding the arms 62, 63 in web feed locking position. Therefore, when the descending plungers 97 engage with pins 98, springs 110 (Figure 6) will be compressed allowing the plungers to pass by the pins 98, leaving the web feed inactive. If desired, one of the sets of pin locking members 109 may be eliminated and the same results obtained. Plungers 97 are provided with plates 111 having elongated slots 112 engaging a pin 113 of bars 35 and 36, slots 112 normally hold the plungers in their operating position.

In Figures 10 and 11, we have shown a modified form of our invention for applying labels or sealing strips to the ends and a part of the bottom of a package adjacent the ends, or to the ends only. In this embodiment articles designated A, which may be completely wrapped or which have been partly enfolded in wrappers during passage through the machine, as described hereinabove, are moved by a pair of pusher arms 20 stepwise to and from seal applying mechanism.

The articles, as heretofore mentioned, are delivered by means of the pusher arms 20, suitably carried by the endless chains 26 and 27 which derive motion in the manner previously described to station S' where a seal applying roller 115 operates in the transverse space between the rear end of plate 24 and the forward end of a second sealing plate 32 of the machine.

Roller 115 preferably is hollow for reasons described hereinafter, and at its ends is equipped with plugs 116, 116a which rotate on the hollow stationary shafts 117 and 118 carried by the swinging arms 119 and 120, respectively, mounted on a shaft 121 carried by the side frames 30 of the machine. The plug 116a is equipped with a sprocket 122 driven from a sprocket 123 on shaft 121 by a chain 124, shaft 121 carries a second sprocket 125 driven from a sprocket 126 on a shaft 127 by a chain 128. The shaft 127 has a gear 129 in mesh with a gear 130 mounted on a shaft 131 also carrying a sprocket 132 which is driven by the endless chain 27.

The arms 119 and 120 are moved up and down, from the seal applying position shown in full lines to the pick-up position shown in dotted lines (Figure 10) by a rod 133 connecting to one end of a cam lever 134 mounted on a pivot shaft 135 carried by the frames 30, and provided with a cam roller 136 adapted to engage in a cam track 137 (see Figure 11) of a cam 138 mounted on a shaft 139. The opposite end of shaft 135 carries an arm 140 supporting one end of a rod 141 connected to arm 120. Cam shaft 139 is equipped with a sprocket 142 driven from a sprocket 143 on shaft 127 by a chain 144.

Shaft 139 carries a cam 145 tracked by a cam follower 146 on a lever 147 fulcrumed on shaft 135. The other end of cam lever 147 (Figure 10) supports one end of a link 148 connected to a rod 149 attached to a transverse frame 150 carrying a knife 151 suitably mounted on frame 150 operative to sever a desired length from a web W to form a label. Knife frame 150 slides on spaced rods 152 depending from hubs 153 of the brackets 154 which are fastened to the sealer plate 32. Knife 151 coacts with a ledger plate 155 attached to a plate 156 on which the severed label or labels rest until picked up by the suction roller 115.

The mechanism just described may be used for applying a single sealing strip in the manner, as described hereinabove, or if desired, relatively narrow webs may be used from which are cut strip lengths suitable for application to one or both ends only (as shown in Figure 12) or to one or both ends and that portion of the longitudinal seam of the package adjacent the ends as shown in Figure 13. Knife 151 is operative equally well regardless of the width or number of webs fed over table 157 to table 156 where cut seal strip lengths are fed by means of roller 115 to seal applying position. The web or webs are fed intermittently by any web feeding mechanism of the type shown in Ferenci Patent No. 2,082,945, granted June 8, 1937, from a reel or reels (not shown) and pass over table 157 between feed rollers 158, 159. As shown in Figure 11, these rollers are designed for feeding either a single wide web or a plurality of relatively narrow webs and for that reason it is believed that a series of axially aligned cylindrical elements are actuated so that the rollers 158, 159 will function to feed any width of web satisfactorily. Feed roller 159 at its ends has shaft portions 160 which are mounted in the side frames 30. A gear 161, mounted on the end of shaft 160, meshes with a gear 162 mounted on a stud 163 carried by frame 30, which stud also supports a gear 164 driving it through a conventional one-way ball clutch (not shown) thus allowing shaft 163 to turn in one direction only as gear 164 is actuated from a gear segment 165 forming a part of a lever 166 pivoted on stud 167 supported by frame 30. Lever 169 which is connected to lever 166 by an adjustable rod 168, has an arm 171 connected through rod 172 to one arm of a ball crank lever 173 pivoted on a stud 174 mounted in frame 30. Pivot point 168a on rod 168 is adjustably mounted on lever 169 and by means of a threaded rod 169a the movement of segment 165 can be controlled to vary the amount of web fed. The other arm 175 of lever 173 is provided with a longitudinal track 176 in which engages a roller 177 pivoted on a disk 178 loosely mounted on cam shaft 139. The hub of disk 178 is provided with a pin 179 which drives disk 178 by means of a pawl 180 pivoted to a crank 181 mounted on cam shaft 139. The disk is driven so long as pawl 180 engages the pin 179 and the paper feed operates in the manner described. If, however, an article is missing in the passageway P, it is desirable that the web feed mechanism be incapacitated in order to avoid waste of strips or labels. This may be accomplished by placing a feeler or registering finger 182 in the path of the oncoming articles forwarded by the conveyor flights (not shown) attached to chains 26 and 27.

Feeler or finger 182 (Figure 10) is mounted on a pivot 183 having a lever 184 which is connected through a link 185 with a lever 186 mounted on a stud 187. Arm 188 of lever 186 has an adjustable link 189 connected to a trip arm 190 pivoted on a shaft 191 and provided with a cam follower 192 which in the down position of arm 190 (Figure 10) lies in the path of the swinging pawl 180. When an article passes finger 182, the latter is pressed down thereby through said linkage, arm 190 is lifted so that the roller 192 is out of the path of pawl 180, the latter remaining in engagement with pin 179. If there is no article to press down the finger 182, the arm 190 remains in its down position and roller 192 then trips the pawl 180 out of engagement with pin 179, thereby stopping the paper feed. Pawl 180 on its next turn automatically re-engages pin 179, if roller 192 is out of its path, otherwise the latter remains disengaged. The feed rollers 158 are mounted on a shaft 193 which carries a gear 194 (Figure 11) driven from a gear 195 on shaft 160, the shaft 193 being mounted in the side frames 30 of the machine.

If the article having labels applied thereto is not completely wrapped when it enters passageway P, but has its bottom end flaps extending beyond its ends, the flaps may be guided in the manner described in the modification shown in Figures 1 to 9, inclusive. The open end flaps F of the wrapper pass under plates 196 fastened to the sealer plates 22, these plates 196 tend to press the flaps F against the heated bottom plate 24, thus heating the wrapper so that the labels L adhere to the same. A backing plate 197 is provided on folder plate 94 (Figure 10) serving to press the labels onto the flaps F as the article passes over the roller 115 and peels the labels L from the same.

As mentioned hereinabove the mechanism shown in Figures 10 and 11 may also be used for applying single long sealing strips, as disclosed in the modification in Figures 1 to 9, inclusive, or if desired, labels with or without spaced advertising indicia may be applied to one or both of the ends of the packages, or short sealing strips may be applied to an end or each end of packages and also to their bottom portions adjacent the ends as shown in Figure 13. Referring to Figures 10 and 11, it will be seen that this mechanism is designed preferably for applying labels or strip seals of the type shown in Figures 12 and 13. If labels of the type shown in Figure 12 are applied, it is preferred to cut suitable lengths from the web W, affix them to the extended bottom end flaps at station S' after which the end flaps with labels attached thereto are folded up against the end of the packages to complete the formation of the end label package shown in Figure 12. The same mechanism is also effective in forming and applying strip seals of the type shown in Figure 13 in which case it is only necessary to utilize a wider band web from which are cut the desired lengths of material corresponding to the strip seal width required. This type of strip seal also may be applied to the extended unfolded bottom flaps as in the case just described where because of the tackiness of the coating on the package wrapper, the strip seals adhere to the underside thereof and to the bottom of the extended flaps and travel with the package as it moves to the end folding mechanism formed by plates 94 and 96. It is also obvious, as described hereinabove, in connection with the modification shown in Figures 1 to 9, inclusive, that strip seals may be applied to each end of a package (as disclosed in Figure 13) after all end flaps have been folded so that when the strip seal is applied to the heat actuated coating on the bottom of a package moving to station S', the seals will adhere thereto adjacent the ends of each package, be folded by slot 95, and sealed against the package ends as the latter is traveled between plates 96. If desired, bottom plate 32 may also be furnished with a conventional type of heating unit (not shown) for furnishing additional heat and insuring the sealing of the strip seals to the bottom of each package.

As shown in Figures 10 and 11, the use of a single suction roller 115 is preferred although if desired two axially aligned rollers could be used in picking up labels or strips from table 156 and applying them at proper times to packages positioned at station S'. Roller 115 is provided with a series of suction holes 198 so distributed along its periphery that any size or length of label or strip can be handled and held thereupon for delivery from table 156 to station S'. Suction is controlled by any conventional type of valve 199 (Figures 10 and 11), two of which are attached to the frames of the machine. Arms 119 and 120 are provided with extensions mounting rollers 200 adapted to engage the valve plungers 201. When the arms 119 and 120 are in their up position (as shown in full lines in Figure 10), rollers 200 depress plungers 201 and suction which enters through a tube 202 is shut off slightly before the label is to be transferred to the flaps of the wrapper. When arms 119 and 120 descend to their lowermost position, the rollers 200 ascend and suction is gradually applied and remains on until the roller 115 has once again almost reached its up position. Suction is led to roller 115 by means of the flexible tubing 203 connected to the hollow shaft 117, 118, respectively. A shield 204, which partly encircles the periphery of roller 115 (Figure 10) is provided to prevent the suction from pulling the leading end of the webs W upward before the label sections L have been severed from the webs.

The feeding of the webs W occur after the roller 115 has reached its up position to apply the previously cut labels onto the flaps F or to the bottom of a package, and the flaps F and labels L then enter the folder 95 formed by the plates 94 and 96 and are folded against the article and heat-sealed thereto in passing plates 96. The finished article has the appearance shown in Figure 12, its end folds are sealed by the label L.

After a length of web W, corresponding to the length of label L, has been advanced onto the plate 156, knife 151 is actuated to sever the leading end of the web. Knife cam 145 has a depressed surface 205 which allows the lever 147 to descend and cause knife 151 to sever a label section L from the web W. During the operation of web feeding rollers 158, 159 which advance the webs along tables 157, 156 to knife 151, roller 115 has been descending and at the completion of the cutting operation, this roller is in its down position, picks up the cut-off labels L, immediately begins to ascend, and at the same time is rotated to advance the label approximately 180° so that as it reaches its up position, the leading ends of the labels are ready to be applied to the wrapper. To adjust the paper feed for different lengths of labels, it is only necessary to vary the attachment point of connecting rod 168 on lever 169 by means of the screw adjustment on lever 169.

The invention also contemplates the use of ordinary uncoated wrappers as well as wrappers which are provided with coatings heat energizable or other types which can be energized to effect a seal. For instance, it may be desired to use a wrapper coated with wax on one side only, say the outside thereof, as a wrapper is applied about an article. With this type of wrapper some measure of heat sealing can be effected by subjecting the package to heat or heat and pressure in the usual manner. It has also been found advantageous to form packages using wrappers coated on one side, as described above, and apply thereto sealing strips of the types described above. When sealing strips provided with suitable adhesive material are brought into engagement with packages wrapped in uncoated wrappers or wrappers provided with adhesive mediums such as heat energizable or solvent energizable coatings, it has been found that such sealing strips readily adhere thereto and form excellent strips or seals.

In the mechanism shown in Figure 14, a web of strip sealing material W provided with either a water energizable adhesive on one face thereof or an uncoated web is fed by mechanism similar to that shown in Figures 1, 2 and 3 between plates 73, 74 past registering pins 69 by means of rollers 64, 65, 56, 57 and 58 mounted on frames 62 beneath a moisture applying roll 200 rotatably supported on a paste pot 202 carried by extensions 204 of frames 62. Roll 200 coacts with roller 206 mounted in the adhesive reservoir, so that adhesive, water or a suitable solvent such as ethylene glycol monomethyl ether can be applied by roller 200 to the web moving therebeneath. Roller shaft 208 is mounted in blocks adjustable to and from the web moving therebeneath. Shaft 208 which supports roll 200 mounts a pulley 210 driven by a belt 212 engaging a pulley 214 on shaft 61 so that whenever roller 58 is rotated, applying roller 200 is also rotated to apply water or solvent to the coated face and to energize the coating thereon and render it tacky or to apply adhesive to a web W so that a strip cut therefrom will adhere to the package to which it is to be applied. The web is fed by rollers 56 and 58 over a guide plate 216 beneath a guide finger 218 secured to bracket 89 and onto strip applying head 31, which at that time is in its lowered position, as shown in dotted lines in Figure 14. When head 31 is raised, knife 88 coacting with ledger plate 90 cuts a length of strip from the leading end of the web and upon further upward movement of head 31, the latter applies the strip to the underside and along the longitudinal seam of a package positioned to receive it.

If strips are to be cut from an uncoated web W, a suitable adhesive or paste is placed in paste reservoir 202 and applied to the web W as it moves beneath the applying roller 200. If desired, a plurality of webs can be fed and registered by means of pins 69 and applied to the bottom and ends of packages to form the type of package shown in Figure 13. Packages with adhesive coating or moisture energized adhesive strip seals attached thereto are moved by flights 20 from the sealing station S' paste folding and sealing mechanism 95, 96 which folds the strips or the extending end flaps and strips secured thereto upward against the ends of the packages in the same manner as described hereinabove.

One form of registering device for webs bearing advertising indicia utilizing a perforated webs is shown in Figures 1, 2 and 3. If similar webs provided with registering marks or spots T are used, mechanism such as that shown in Figure 15 can be employed to advantage. Gear segment 165 oscillated by lever 175 (Figure 10) drives gears 162 and 161 in the manner set forth hereinbefore to drive roller 159 which coacts with roller 158 to feed lengths of web intermittently to head 31 whenever a package is positioned at station S'. Roller 158 is mounted in levers 220 pivoted in frames 30 (not shown) and extends across the machine above roller 159, with which its coacts. One of the levers 220 is provided with an arm 222 connected by link 223 to armature 224 of a solenoid 226 connected in the control circuit of a conventional relay R for registering the web in accordance with the movement of spots T relative to light 240 and adjustably mounted photo-electric cell 238, so mounted in order to accommodate webs of different thicknesses. By means of a thyratron 234 and a thermionic tube 236, the modulations in current through photo-electric cell 238 due to the movement of a spot T relative to light 240 and photo-electric cell 238 in a known manner energizes solenoid 226 thereby causing roller 158 to be swung out of operating coaction with respect to roller 159 which stops the feed of the web in proper register relative to knife 151. A normally closed switch 241 maintains the circuit through solenoid 226 closed until segment 165 moves to its inoperative position (as shown in Figure 14) whereupon an abutment 242 mounted thereon engages switch 241 and opens the circuit, thereby deenergizing solenoid 226. Roller 158 thereupon drops down upon the web and is held in operative position with respect to roller 159 by means of a spring 244. When segment 165 is rocked counterclockwise (Figure 14), switch 241 again closes the circuit so that a length of web will be fed until a spot T again causes energization of solenoid 226 to stop the feed.

The invention above described may be varied in construction within the scope of the claims, for the particular device, selected to illustrate the invention, is but one of many possible concrete embodiments of the same. It is not, therefore, to be restricted to the precise details of the structure shown and described.

What is claimed is:

1. In a strip sealing mechanism, a package runway provided with a strip sealing station, and means for moving packages to be sealed through said runway and to said station, means for mounting a roll supply of relatively wide web strip sealing material beneath said runway, means for feeding said strip sealing material beneath said runway and in the direction of movement of a package located at said station to receive said strip, means for cutting a short length from the leading end of said web, means for raising said length and affixing an edge thereof to said package, and means for moving said package from said station along said runway to complete the application of said length thereto.

2. In a strip sealing mechanism, a package runway provided with a strip sealing station, and means for moving packages to be sealed through said runway and to and past said station, means for feeding a wide web of strip sealing material beneath said runway in the direction of movement of a package located at said station to receive said strip, means for registering said web after each feeding movement, means for cutting a short length from the leading end of said web, and means for affixing the leading edge of said length to said package.

3. In a strip sealer, the combination with an article support, of means for moving wrapped articles sideways along said support and for locating an article at a strip applying station, means for feeding in the direction of movement of said article a length of sealing strip material of a width greater than the length of said article and positioning the same beneath said article, a means for affixing the leading edge only of said length of material upon the bottom of said article, said last named means including mechanism operating in timed relation with said means for moving wrapped articles along said support, and means in the path of movement of said articles along said support for wiping said length along the bottom of said article.

4. In a strip sealer, the combination with an article support, of means for moving wrapped articles sideways along said support and for locating an article at a strip applying station, means for feeding in the direction of movement of said article a length of sealing strip material of a width greater than the length of said article and positioning the same beneath said article, a strip affixing member located at said station beneath said support, said member being constructed and arranged to receive said length, means for moving said member upwardly towards the bottom of said article to affix the leading edge of said strip material length to the bottom of said article with the ends of said strip projecting beyond the ends of said article, means located adjacent said station for completing the application of said strip length to the bottom of said article as said article moves from said station, and means spaced along said support for folding said strip ends up against the ends of said article.

5. In a strip sealing mechanism, the combination with an article runway and means for moving a succession of articles along said runway and locating said articles thereon for sealing, means for feeding a short strip of sealing material in a direction at right angles to the length of an article positioned to receive said strip, means for moving the leading edge portion of said strip into sealing engagement with said article, means located in said runway constructed and arranged to affix said strip to said article moving along said runway, and mechanism for incapacitating said strip material feeding means whenever an article is not fed to said station.

6. A strip sealing machine comprising, means for supporting a package having a bottom seam and end folds at a strip sealing station with said seam and end folds exposed for application of a seal thereto, means for feeding a web of seal strip material, means for cutting off a length of said material, means for advancing said cut off strip sidewise relative to the seam of said package, a strip affixing member having a curved surface constructed and arranged to receive said strip, means for moving said member upwardly towards said bottom seam of said package to affix a portion of said strip thereto, means for wiping said strip over said bottom seam and means for folding up and securing a part of said strip against said folds.

7. In a strip sealing mechanism, an article feeding passageway provided with spaced guiding and sealing members and a bottom sealing and supporting table, said table having a transverse gap located between its ends, means for moving packages to be sealed and provided with wrappers having a thermoplastic coating along said runway and locating the same adjacent said gap in strip sealing position with the coating on the bottom and ends thereof rendered tacky by passage along said runway, an applying device mounted for movement into and out of said gap, means for feeding a relatively wide web of strip sealing material having a heat sensitive coating thereon, means for cutting a strip length from the leading end of said web, means for moving said device upwardly into said gap to affix a transverse portion of said strip to said package whereby the coating on said strip is activated by contact with said heated wrapper coating and affixes itself thereto, and means operative upon further movement of said package along said passageway for completing the affixation of said strip to said package.

8. In a strip sealing mechanism, an article feeding runway provided with spaced guiding members, and a supporting table having a transverse gap intermediate its ends, means for moving packages to be sealed through said runway and locating the same adjacent said gap in strip sealing position, a strip seal applier having an outwardly curved strip supporting surface mounted for movement into and out of said gap, means mounting said applier for receiving a strip seal, means for feeding a relatively wide web of strip sealing material in a direction at right angles to said gap onto said surface of said applier with the leading edge located for affixing to a package, means for cutting a narrow length from the leading end of said web, means for moving said applier with said cut length positioned thereon into engagement with the package to affix said leading edge of said strip length thereto with the ends thereof projecting beyond said package ends, means for completing the application of said strips to said package and end flaps, and strip end folding means located on opposite sides of said runway past which packages in said runway are moved from said position to fold said strip ends against the ends of said packages.

9. Strip sealing mechanism comprising an article support, spaced guiding members located above and adjacent said support, means for moving partially formed packages between said members and over said support with the bottom end flaps of said package extending outwardly and beneath said members, means for affixing a relatively narrow sealing strip to the bottom of said package and to the underside of said outwardly extending unfolded flaps with the ends of said strip extending beyond the ends of said flaps, and means located along the path of travel of packages over said support for folding said flaps upwardly against the ends of said package and sealing said extending ends of said strip against said package ends.

10. Strip sealing mechanism comprising an article support, spaced guiding members located above and adjacent said support, means for moving partially formed packages between said members and over said support with the bottom end flaps extending outwardly above said table, guide means for holding said flaps extended, a strip seal station to which said packages are delivered with said flaps extended, means operative at said station for applying a sealing strip to the bottom of said package and to said extended flaps with the ends of said strip projecting beyond said flaps, and means for folding said flaps against the ends of said package and sealing said strip ends thereto.

11. In a strip sealing machine, the combination with an article passageway, of means for advancing a succession of partially wrapped packages along said passageway with the bottom end flaps thereof projecting substantially horizontally beyond the ends of said articles proximate said passageway, mechanism for affixing sealing strips to the underside of said end flaps of each of said articles with the ends of said strips extending outwardly in a substantially horizontal plane beyond the ends of said flaps, and means positioned along said passageway for folding said flaps against the packages and securing the ends of said sealing strips thereto.

12. In a strip sealing machine, the combination with an article passageway, of means for advancing a succession of partially wrapped packages with the bottom end flaps thereof projecting outwardly in substantially horizontal planes beyond the ends of said articles, mechanism for affixing sealing strips to the underside of each of said end flaps of each of said articles with the ends of said strips extending outwardly in substantially horizontal planes beyond the ends of said flaps, means for holding said flaps extended outwardly in said substantially horizontal planes during the operation of said mechanism, and means for folding said flaps upwardly against the packages and securing the ends of said sealing strips thereto.

13. Mechanism for applying seals to wrapped packages comprising an article support, means for feeding a relatively wide web of sealing material to a position proximate said support, means for cutting a narrow strip length from the leading edge of said web, a strip applying member, means mounting said member in the path of movement of said sealing material to receive said narrow strip length, means for moving said member upwardly to apply an edge portion of said cut strip to said article, and means for advancing said article and partially applied strip in the direction of feeding movement of said material over said support to affix said entire strip against said article.

14. Mechanism for applying seals to wrapped packages comprising, a substantially horizontal article support along which packages consisting of articles having wrappers provided with thermoplastic coatings are moved for sealing, means for feeding the leading end of a relatively wide web of strip material in the direction of travel of packages along said support to a position adjacent said support, means for cutting a narrow strip from said leading end of said web, means for moving the leading edge of said strip into sealing engagement with said package with the ends thereof projecting outwardly beyond the ends of said package, means for energizing said wrapper coating to effect a seal of said edge of said strip thereto, and means in the path of travel of said package along said support for completing the application of said strip to said package, said last named means including heated means for folding said strip ends against the ends of said article and sealing the same thereto.

15. Mechanism for applying strip seals to partially wrapped packages having a longitudinal wrapper seam and projecting bottom end flaps comprising, a package support, a seal applying device coacting with said support to apply a seal to each package, means for feeding a web of seal material in a path at right angles to the longitudinal axis of said package, means for cutting a strip length from the leading end of said web for delivery by said device to said package, means for moving said device to affix said seal to said package along said longitudinal seam and to the exterior of said extending flaps with the ends of said seal projecting beyond the ends of said flaps, and opposed stationary folding and sealing devices spaced from said support and positioned therealong for folding said end flaps against the ends of said package and securing said seal thereto.

16. Strip sealing mechanism comprising, an article support, a sealing station, spaced guide members located above and adjacent said support, means for moving packages provided with wrappers having a thermoplastic coating between said members and over said support to said station, means for energizing the coating on the bottom and end flaps of said wrapper during the movement of said package to said station, means for feeding a relatively short sealing strip greater in width than the length of a package to said station in a direction transverse to the longitudinal axis of said package for application thereto, means operative at said station for bringing a transverse portion only of said strip into engagement with said energized wrapper coating to affix said portion of said strip to the bottom and end flaps of said package, and means positioned in the path of travel of said package along said support for completing the application of said strip to said bottom and end flaps.

17. Strip sealing mechanism comprising, an article guide support provided with a sealing station, spaced guide members located along said support and forming therewith an article guide runway through which packages having wrappers provided with a heat sensitive coating are moved to said station, means for energizing said coating on the bottom and ends of said packages as the same are advanced to said station, means for feeding a relatively short length of a sealing strip greater in width than the length of a package and provided with a heat sensitive coating to said station for application to a package positioned at said station for strip sealing, means operative at said station for moving a transverse portion only of said sealing strip into engagement with said energized coating on said wrapper to cause partial adherence of said coated strip to said package, means positioned in the path of travel of said package along said support for completing the application of said strip to said bottom of said package, and means forming a part of said runway for subsequently folding said projecting ends of said strip against said ends of said package as said package is moved therebetween.

18. Strip sealing mechanism comprising, an elongated article guide support provided with a sealing station, spaced guide members located along said support and forming therewith an article guide runway through which packages having wrappers provided with a heat sensitive coating are moved sideways to said station, means for energizing said coating on the bottom and ends of said packages as the same are advanced to said station, means for feeding a short length of a sealing strip greater in width than the length of a package and provided with a heat sensitive coating to said station in the direction of movement of said package for application to a package positioned at said station for sealing, means for registering each length of said web as it is fed, means operative at said station for moving said sealing strip into engagement with said energized coating on said wrapper to affix said strip to the bottom of said package along the longitudinal seam thereof, and opposed folding and sealing means located along said runway and operative when said package is moved from said station along said support for folding said strip ends against said ends of said package and for sealing said strip to the ends of said package.

19. In a wrapping machine, an article support, conveying means for moving a partially wrapped article over said support with unfolded flaps extending outwardly in substantially horizontal planes beyond the ends of said article proximate said support, means for applying an adhesive coated strip to the bottom of said article and the underside of each of said outwardly extending flaps, and means for folding said flaps upwardly against the ends of said article and sealing them thereagainst by said strip.

20. In a wrapper strip sealing machine having an article guideway provided with a transverse gap, and mechanism for positioning articles to be strip sealed in succession adjacent said gap with the longitudinal seam and end flaps exposed, means for feeding spaced webs of strip sealing material in the direction of movement of said packages, cutters for cutting sealing strips from each of said webs for simultaneous application to said packages, means for rendering said strips adhesive, strip applying means, mechanism operative in timed relation to the travel of packages over said gap and along said runway for moving said last-named means into and out of said gap for affixing said adhesive strips to the longitudinal face of a package adjacent said ends, and other means located along said guideway for folding part of said strip against the ends of said package.

21. In a strip sealing machine, a package guide chute provided with a gap extending transversely thereof, means for feeding packages along said chute and locating them above said gap with the bottom longitudinal seams of said packages exposed, means for feeding a wide web of strip sealing material into said gap and beneath said article, a strip applier beneath said guide chute constructed and arranged to receive the leading end of said web, means for cutting off a short sealing strip length from the leading end of said web, means for rendering said length adhesive, means for moving said applier upwardly into said gap to tack a transverse portion of said strip length to said article, and means operative upon further movement of said package and strip length along said chute for completing the application of said strip length to said package.

22. In a seal applying machine having an article runway and means for supporting at a sealing station extending transversely across said runway an article enclosed in a wrapper provided with a heat sensitive coating forming a package with a longitudinal seam and folded end flaps wherein said seam is exposed, means for moving a succession of packages along said runway to and from said station, means for energizing said coating adjacent said seam, a strip affixing device located at said station, means for moving said device upwardly to apply a sealing strip having a heat sensitive coating and of a length greater than the length of said package over said seam with the ends thereof projecting beyond the ends of said package whereby said heated coating on said wrapper renders said coating on said strip adhesive and secures the same to said package, spaced folders located along said runway proximate said station and operative when a package is moved from said sealing station for folding said strip ends against the ends of said package, and means carried by said folders for sealing said folded ends against said package ends.

23. In a wrapping machine wherein articles are enveloped in a wrapper folded to produce a package having a bottom seam and end folds, means for advancing packages to a sealing position, means for holding the bottom end folds of a package extended substantially horizontal outwardly away from the ends of said package, means for applying a seal to the underside of each of said folds at said substantially horizontal position, and means for folding said flaps and seals upwardly against the ends of said package and securing said seals thereto.

24. In a wrapping machine wherein articles are enveloped in a wrapper folded to produce a package having a bottom seam and end folds, means for advancing packages to a seal applying station with the bottom end flaps of said package extended in substantially horizontal planes outwardly beyond the ends of said article, web feeding mechanism located adjacent the ends of said package for feeding lengths of webs in the direction of travel of said packages, means for cutting seals from the leading ends of said webs for application to said substantially horizontal flaps, means for applying said seals to said flaps, and means for folding said flaps and seals upwardly against the ends of said package and securing said seals thereto.

25. In a wrapping machine wherein an article is enveloped in a wrapper folded to produce a package having a bottom seam and end folds, means for advancing a package to a seal applying station with the bottom end flaps of said package extended in substantially horizontal planes beyond the ends of said article, web feeding mechanism located adjacent the ends of said package for feeding lengths of webs bearing spaced indicia thereon, means for registering said webs, means for cutting seals from the leading ends of said registered webs for application to said substantially horizontal flaps, means for applying said seals to said flaps, and means for folding said flaps and seals upwardly against the ends of said package and securing said seals thereto.

26. In a wrapping machine wherein articles are enveloped in a wrapper folded to produce a package having a bottom seam and end folds, means for advancing packages to a sealing position, means for holding the bottom end folds of a package extended outwardly in substantially horizontal planes away from the ends of said package, means for feeding seals in the direction of movement of said packages towards each of said outwardly extended flaps, means for rendering said seals adhesive, means for applying a seal to the underside of each of said outwardly substantially horizontally extended flaps at said position, and means for folding said flaps and seals upwardly against the ends of said package and securing said flaps and seals thereto.

27. In a wrapping machine wherein articles are enveloped in a wrapper folded to produce a longitudinal seam and end folds, a package sealing station, means for advancing packages to said station for sealing with the bottom end flaps projecting outwardly in substantially horizontal planes beyond the ends of said packages, a seal applier having a rounded seal supporting surface mounted for movement into and out of engagement with said flaps at said station, means for holding said flaps in said substantially horizontal planes at said station, web feeding mechanism for feeding webs of seal forming material to said station and depositing the leading ends on said surface of said applier, means for cutting seals of predetermined lengths from said webs, means for moving said applier to affix the leading edge of said cut seals to said flaps, and means for folding said flaps and attached seals against the ends of said package to secure the same thereto.

28. In a wrapping machine wherein articles are enveloped in a wrapper folded to produce a longitudinal seam and end folds, a package sealing station, means for advancing packages to said station for sealing with the bottom end flaps projecting outwardly in substantially horizontal planes beyond the ends of said packages, a seal applier mounted for movement into and out of engagement with said flaps at said station, means for holding said flaps in said substantially horizontal planes at said station, web feeding mechanism for feeding webs of seal forming material to said station, means for cutting seals of predetermined lengths from said webs, means for moving said applier in timed relation with the movement of said packages into and out of engagement with said flaps of a package at said station to affix said cut seals to said flaps, and means spaced from said station for folding said flaps and attached seals against the ends of said package to secure the same thereto.

29. The method of forming strip sealed packages from articles enclosed in wrappers having a heat sensitive coating folded to produce a bottom seam and end folds which comprises, positioning a package for strip sealing, energizing a portion of said coating adjacent said seam to render it adhesive prior to positioning for strip sealing, feeding the leading end of a web of strip sealing material provided with a heat sensitive coating on one face thereof to a position proximate the bottom seam of said package, cutting a predetermined length from said web, moving the transverse leading edge of said length into engagement with said coated portion of said wrapper along said bottom seam to render the coating on said strip adhesive and thereby affix a portion of said edge of said strip to said package with the ends thereof projecting beyond the ends of said package, completing the application of said strip to said bottom seam of said package, and then folding said strip ends upwardly against the ends of said package, and sealing the same thereto.

30. The method of forming strip sealed packages from articles enclosed in wrappers folded to produce packages having a bottom seam and end flaps which comprises, positioning packages for strip sealing with bottom end flaps extending outwardly in substantially horizontal planes beyond the ends of the packages, feeding a web of strip sealing material to a position proximate the bottom of a package, cutting a strip from the end of said web sufficient to adhere to the bottom of said article and extend beyond the end of said flaps, affixing said strip to the bottom seam and exterior of said outwardly extended bottom end flaps, and then folding said flaps upwardly against the ends of said package and sealing said strip ends thereto.

31. The method of forming strip sealed packages from articles enclosed in wrappers folded to produce packages having a bottom seam and end folds which comprises feeding a succession of packages along a support, positioning packages for strip sealing with bottom end flaps extending beyond the ends of the packages, feeding webs of strip sealing material in the direction of movement of packages along said support to positions proximate the bottom of a package, cutting strip lengths from said webs sufficient to adhere to spaced portions of the bottom of said article and extend beyond the end of said flaps, affixing the leading edge of said strips to the bottom seam and exterior of said extended flaps, advancing said package and attached strips further along said support to complete the affixation of said strips to said bottom seam and end flaps, and then folding said flaps against the ends of said package and sealing said strip ends thereto.

32. The method of forming strip sealed packages from articles enclosed in wrappers provided with a thermoplastic coating folded to produce a bottom seam and end folds which comprises, moving said packages along a support, holding a package positioned on said support for sealing with an end flap at each end thereof extending outwardly in substantially horizontal planes beyond the ends of and adjacent the bottom of said package, rendering a portion of the coating on said flaps adhesive, feeding webs of end label material beneath said packages and in the direction of movement of said packages along said support, positioning an end sealing label adjacent each outwardly extended flap, cutting end labels from the leading ends of said webs, moving each label upwardly and applying the leading edge of said labels to the exterior of each outwardly extending flap whereby said adhesive on said flaps secures said leading edge of said labels to the exterior thereof, advancing said package and labels further along said support and completing the affixation of said labels to said flaps, and then folding said flaps and labels upwardly against said ends of said package and securing said flaps and labels against said ends.

33. The method of forming strip sealed packages from articles enclosed in wrappers provided with a thermoplastic coating folded to produce a bottom seam and end folds which comprises, holding a package positioned for sealing with an end flap at each end thereof extending outwardly in substantially horizontal planes beyond the ends of said package, rendering a portion of the coating on said flaps adhesive, positioning an end sealing label provided with a heat sensitive coating on one face adjacent each extended flap, applying said labels to the exterior of each flap whereby said adhesive on said flaps coacts with said adhesive on said labels and secures said labels to the exterior thereof, and then folding said flaps and labels upwardly against said ends of said package and securing said flaps and labels against said ends.

34. The method of forming strip sealed packages from articles enclosed in wrappers folded to produce packages having a bottom seam and end folds which comprises, moving packages to be strip sealed along a supporting surface, positioning packages for strip sealing with bottom end flaps extending in substantially horizontal planes beyond the ends of the packages, feeding webs of label material to positions proximate said extended end flaps, cutting end labels from said webs sufficient to adhere to said flaps and extend beyond the end of said flaps, affixing an edge of said labels to the exterior of said extended flaps, completing the application of said labels to said flaps, and then folding said flaps with said labels attached thereto against the ends of said package and sealing said strip ends thereto.

35. In a wrapping machine having a strip sealing station constructed and arranged to expose the longitudinal seams of packages to be sealed, mechanism for applying sealing strips to partially wrapped packages comprising, a package guideway, means for moving packages with bottom end flaps projecting outwardly beyond the ends of said packages along said guideway, means for feeding spaced webs of strip sealing material in the direction of travel of said packages along said guideway to said station, means for cutting lengths of strip sealing material from said webs, means for rendering said strips adhesive, means for applying said strips to the longitudinal seam of each of said packages and each outwardly projecting bottom end flap, and means for folding said flaps upwardly against the ends of each of said packages to affix said strips to the ends of each of said packages.

36. The method of forming strip sealed packages from articles enclosed in wrappers folded to produce a bottom seam and end folds which comprises, moving a package along a guideway, holding said package positioned in said guideway for strip sealing, feeding a relatively wide web of strip sealing material having a width greater than the length of said package to a station adjacent said package, registering said web, cutting a short strip length from the end of said registered web, moving an edge of said strip into engagement with said bottom seam to partially affix said strip thereto with the ends of said strip projecting outwardly beyond the ends of said package, and then displacing said package along said guideway to complete the affixation of said strip to said bottom seam and then folding said projecting ends of said strip upon the end folds of said package.

37. The method of forming strip sealed packages from articles enclosed in wrappers having a thermoplastic coating, which wrappers are folded about articles to produce packages having a bottom seam and end folds which comprises, moving a package along a guideway, positioning said package at a sealing station for strip sealing, energizing a portion of said coating adjacent said bottom seam to render the coating tacky and adhesive prior to positioning at said station for strip sealing, feeding a web of strip material greater in width than the length of said packages to a point adjacent said seam, cutting a short length of strip from the end of said web, moving said strip into engagement with said bottom seam whereby said heated coating on said wrapper affixes the strip thereto with portions of said strip extending beyond the ends of said package, then advancing said package with said strip partially secured thereto along said guideway, folding said strip ends upwardly against the ends of said package, and sealing the said ends together.

LEON V. WHIPPLE.
SAMUEL W. POLLOCK.